Feb. 16, 1937.　　　R. B. McMULLEN, JR　　　2,070,800
MOTORIZED BICYCLE
Filed Feb. 4, 1935　　　3 Sheets-Sheet 1

Inventor
Roger B. McMullen, Jr.
By Gibson, Mann & Cox
Attys

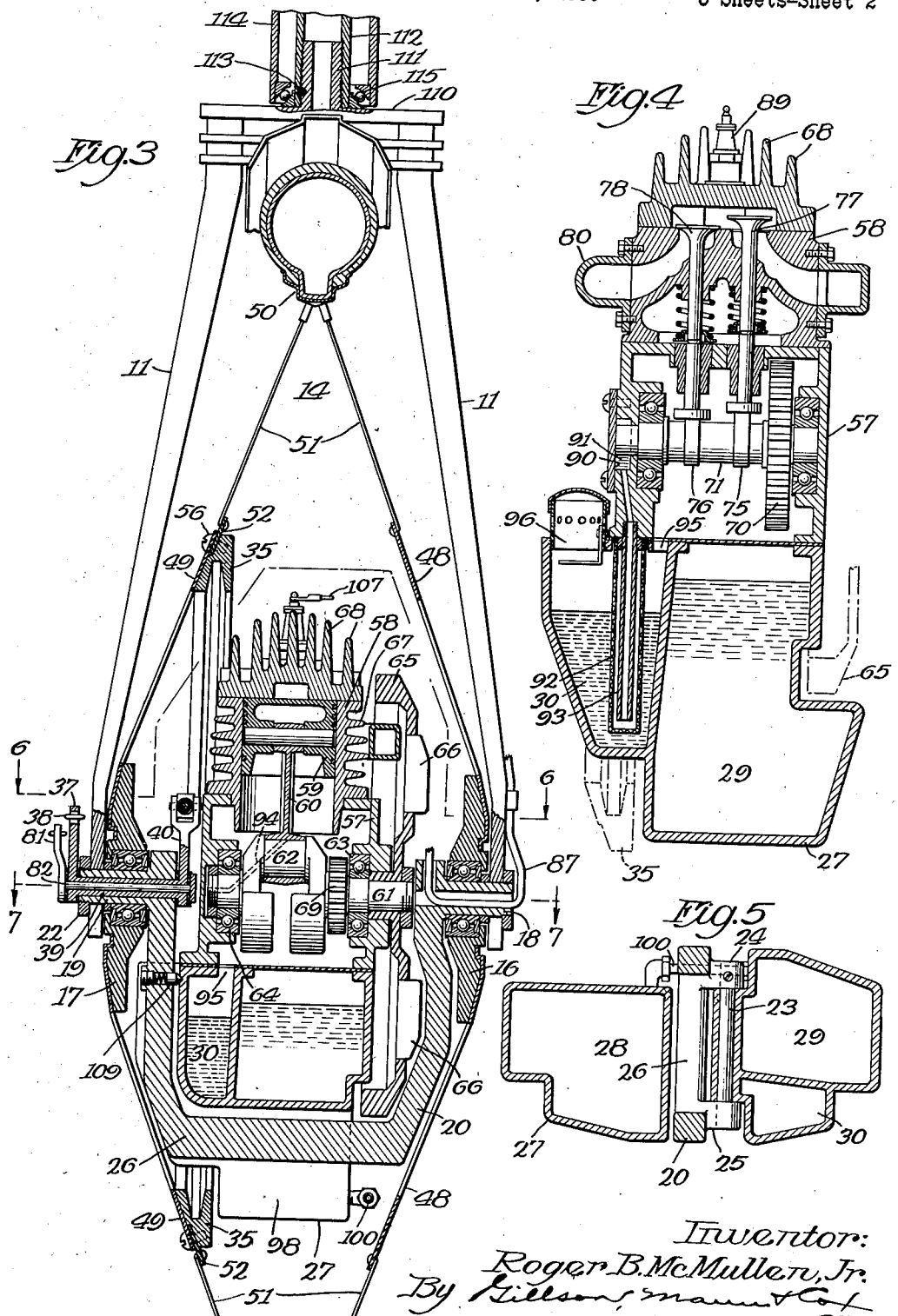

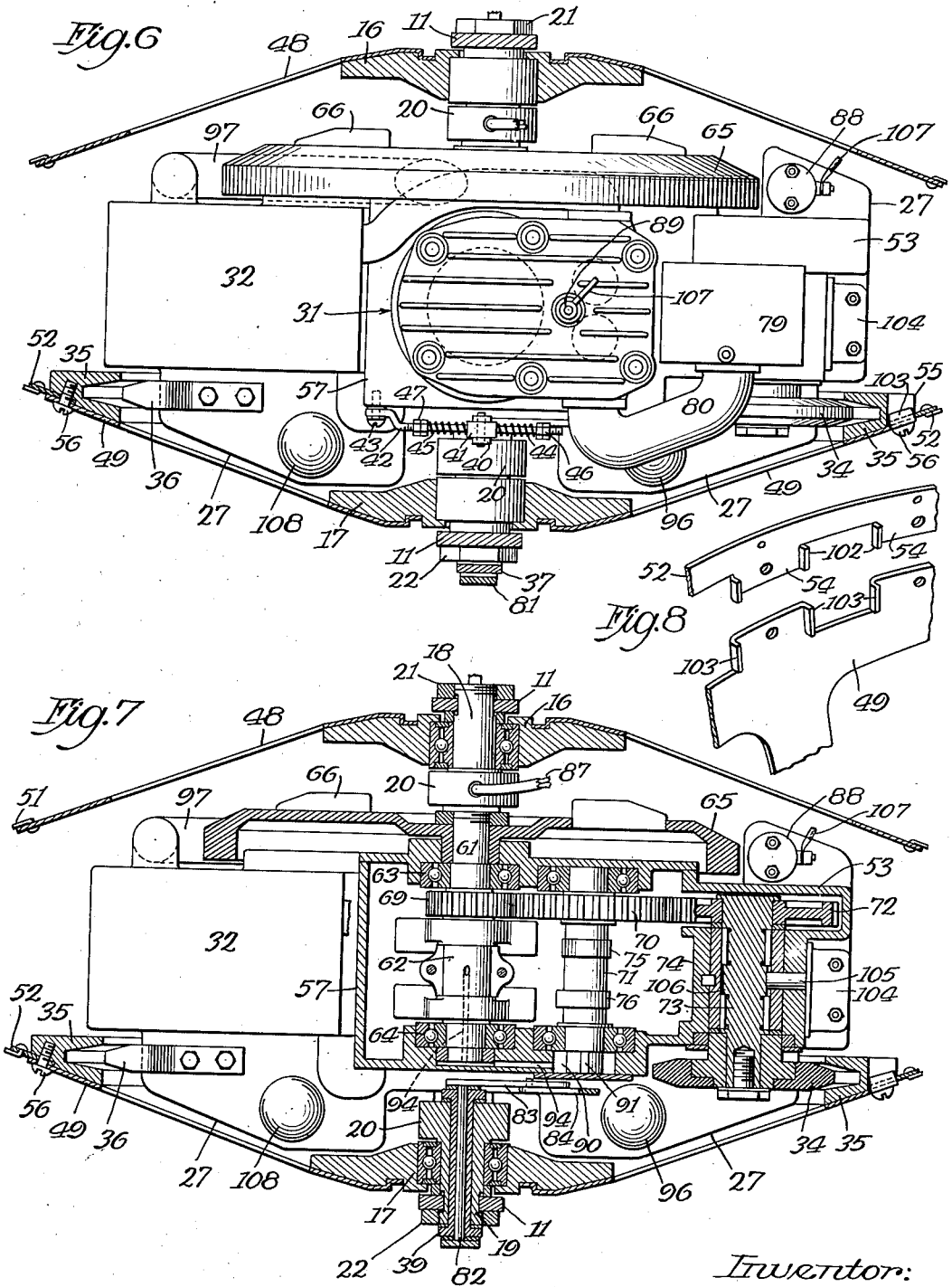

Patented Feb. 16, 1937

2,070,800

UNITED STATES PATENT OFFICE 2,070,800

MOTORIZED BICYCLE

Roger B. McMullen, Jr., Evanston, Ill.

Application February 4, 1935, Serial No. 4,751

14 Claims. (Cl. 180—33)

The invention relates to motor driven bicycles of the type in which a motor is enclosed between the spokes of one of the wheels of the vehicle; its objects being to secure simplicity of construction, reliability of action, and improved means of control and of the application of driving power and braking pressure.

A further object is to provide a wheel equipped with a driving motor for causing its rotation, and which is adapted to be substituted for one of the wheels of a bicycle of conventional type, with substantially no change in the frame of the vehicle.

Other details of improvement will be hereinafter pointed out.

In the accompanying drawings illustrating the invention—

Fig. 3 is a transverse vertical section of the front wheel and the head of the bicycle, some parts being broken away;

Fig. 4 is a detail section on the line 4—4 of Fig. 2;

Fig. 5 is a detail section on the line 5—5 of Fig. 2;

Fig. 6 is a detail section on the line 6—6 of Fig. 3;

Fig. 7 is a detail section on the line 7—7 of Fig. 3; and

Fig. 8 is a fragmental detail in perspective of certain parts of the device.

Figure 1:
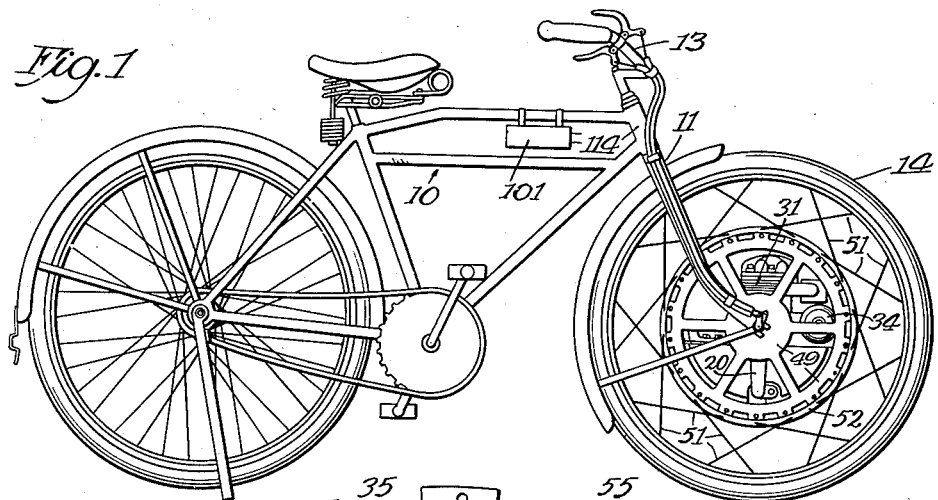
Fig. 1 is a side elevation of the improved bicycle.
Figure 2:
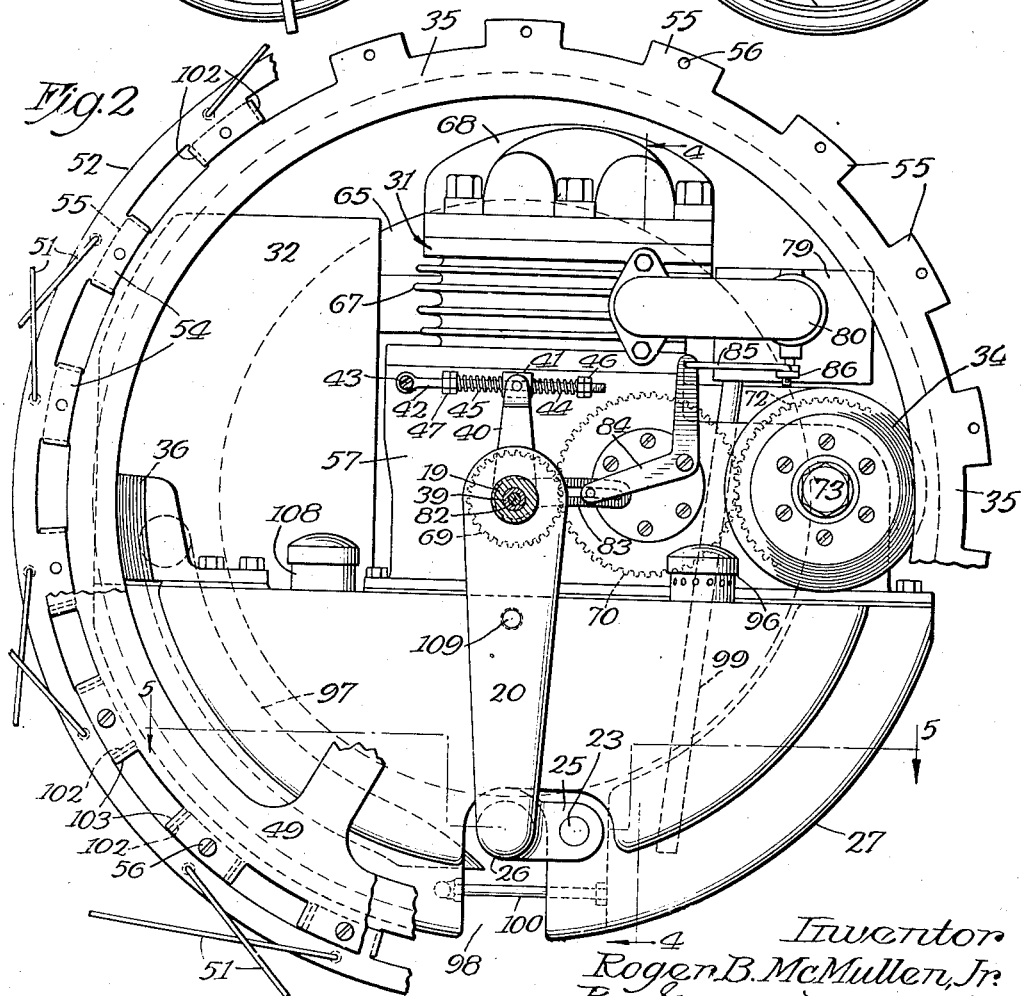
Fig. 2 is a detail side view, partly in elevation, partly in section, and with some parts broken away, of the power mechanism and of the wheel in which it is mounted.

The invention is illustrated as applied to a bicycle, differing from the ordinary pedal driven vehicle only in that a motor is mounted within a specially constructed road wheel and is manually controlled by mechanism mounted on the steering head and extending downwardly through or beside the frame. Preferably, though not necessarily, the motor is incorporated in the front wheel, as shown, and consequently the ordinary pedal mechanism is present and may be used to start the motor and alternatively with or to supplement the power drive.

The frame of the bicycle is generally designated by the numeral 10, and is of ordinary construction, save as to the matters hereinbefore referred to, and requires no further description.

The front fork 11 carries the usual steering post, upon which the handle bar 13 is mounted. This fork is of sufficient width to accommodate the front wheel, generally designated by the numeral 14, which is of special construction and incloses between its side walls a chamber of ample capacity to contain the power mechanism. The hubs 16, 17, of this wheel are mounted, by means of ball bearings, upon the trunnions 18, 19, of a U-shaped cradle 20, located within the wheel chamber. This cradle is locked to the fork 11 against motion relatively thereto, its trunnions having flat side faces. Binding nuts 21, 22, threaded upon the trunnions, secure the cradle to the fork.

The motor assembly is pivotally mounted upon a rod 23, carried in a pair of lugs 24, 25, projecting laterally from the cross member 26 at the bottom of the cradle 20. This assembly comprises a tank 27, having compartments 28, 29, for fuel, and 30 for lubricant; an internal combustion engine, generally designated by the numeral 31; and an exhaust muffler 32,—these several elements being rigidly attached together.

A friction wheel 34, forming a part of the gear mechanism of the motor 31, cooperates with an internally channeled friction sheave 35, carried by the wheel 14 for driving the latter. A brake shoe 36, mounted at approximately the diametrically opposite side of the power assembly from the friction wheel 34, cooperates with the same friction sheave for checking the speed of the vehicle.

The oscillation of the motor assembly for alternatively engaging the friction wheel 34 and the brake shoe 36 with the sheave 35, is controlled from the steering head 13 by means of a Bowden wire 38, leading to crank arm 37. This crank arm is fixed upon the outer end of a shaft 39, journaled axially within the trunnion 19, and carrying at its inner end a crank arm 40, pivotally connected to a block 41, slidably mounted upon a rod 42, pivotally attached, as shown at 43 to the base of the motor 31. Power is communicated from the crank arm 40 to the rod 42 through a pair of helical springs 44, 45, mounted upon the rod and reacting between the block 41 and nuts 46, 47, carried by the rod.

The central sections, as 48, of the side walls of the wheel are formed of sheet metal rigidly secured to the hubs 16, 17, and which are connected to the rim of the wheel by wire spokes 51. One of these walls, as 48, may, if desired, be differently constructed, it being structurally essential only that the hub and rim be securely connected. The other wall has a removable central panel 49, to permit the introduction and removal of the motor assembly, this panel being permanently attached to the hub 17 and detachably connected at its outer margin with a sheet metal annulus 52, to which the wire spokes 51 are secured.

In order to provide for adequate driving connection of the sheave 35 with the annulus 52, while permitting the entry of the sheave through the annulus in assembling, the latter has a series of radially instanding lugs 54, and the sheave 35 a corresponding series of radially outstanding lugs 55. The lugs of the annulus are spaced to permit the entry of the lugs 55, and preferably have laterally instanding ears 102 between which the lugs 55 snugly fit after the sheave has been turned to bring the two sets of lugs in alinement. Screws 56 are used for securing the lugs together, and to the plate 49, which is of sufficient diameter to overlap the annulus 54, but is preferably notched, as shown in Fig. 8,—the lugs thus formed being flanked by instanding ears 103, which snugly embrace the ears 102. The screws 56 are thus relieved of much of the driving stress. The motor assembly is inserted into the wheel when the latter is removed from the fork 11, and the plate 49 is detached from the annulus 52. The sheave 35 having been fitted over the wheel 34 and brake shoe 36, the motor assembly having been seated within and attached to the cradle 20, and the hub 17 having been fitted upon the trunnion 19, the whole is thrust into the chamber of the wheel, the trunnion 18 being inserted through the hub 16. The sheave 35 is now turned to bring the lugs 54 and 55 together, and the attaching screws 56 are applied.

The internal combustion engine employed is of the ordinary four-cycle type, and comprises a crank case 57 and a cylinder block 58. The piston is shown at 59, and the connecting rod at 60. The crank shaft is designated 61, and its crank 62. The crank shaft is provided with ball bearings located within the crank case, as shown at 63, 64. The fly wheel 65 is mounted upon a protruding end of the crank shaft 61. The web of this fly wheel may be in the form of spokes or of an apertured plate, as desired, and is provided with vanes 66 for creating an air blast upon the cylinder of the motor, which, as is usual in air cooled motors, is provided with radiating ribs 67, 68.

The train of driving gears is located within the crank case 57, and a lateral extension 53 thereof, and comprises a pinion 69 which is fixed upon the crank shaft and meshes with a speed reducing gear wheel 70, mounted upon a shaft 71, suitably journaled within the walls of the crank case. The gear 70 drives a gear wheel 72, mounted upon a shaft 73, journaled within a box 74, projecting inwardly from one side of the gear case extension 53, the shaft extending through the wall of the crank case and carrying the friction wheel 34. The shaft 71 carries the cams 75, 76, for controlling the intake and exhaust valves 77, 78.

The carburetor is conventionally shown at 79, and the intake pipe leading to the cylinder at 80. This pipe will be provided with the usual throttle valve, which is controlled by means of a crank arm 81, to which leads a Bowden wire from the steering head of the vehicle, and which is mounted upon a shaft 82, journaled within the tubular shaft 39 and projects beyond the crank arm 40. The inner end of this shaft is provided with a slotted crank arm 83, actuating a bell crank 84, which is connected by means of a link 85 with a crank arm 86 on the stem of the valve.

It is proposed to use some known form of normally open make and break system of ignition, of which only parts are illustrated, and which will, of course, be controlled at the steering head of the vehicle. A casing for a dry cell, to supply current to the system, may be hung on a portion of the vehicle frame, as indicated at 101. At 87 is shown the leading-in wires of the circuit; at 88 a transforming coil; and at 89 a spark plug. From the coil 88 wires will lead to the make and break mechanism, conventionally shown at 104, and which is actuated by a plunger 105, projecting into the crank case of the motor and controlled by a cam 106, on the shaft 73, which shaft rotates at the same speed as the cam shaft 71. One terminal of the coil 88 is connected with the spark plug by a wire 107.

The shaft 71 projects into a pump chamber 90, and is provided with vanes, as 91, for drawing oil from the chamber 30 through the screen 92 and pipe 93, and discharging it through a duct 94, leading to and through the crank shaft and to the bearing of the connecting rod on the crank pin 62. Oil escaping from this bearing will be spattered upon the cylinder walls and will lubricate the bearing at the upper end of the connecting rod. The excess oil will escape from the crank case through an outlet 95, returning to the oil tank 30.

A filling and breathing opening is provided in the oil tank 30, as shown at 96, and a filling nipple for the gas tank is shown at 108. The exhaust muffler discharges through a pipe 97, leading downwardly.

The fuel tank extends below the cross member 26 of the cradle 20, and is configured, as indicated at 98, to accommodate it. In order to draw fuel through the pipe 99 leading to the carburetor 79 from both sections 28, 29, of the tank, these two sections are connected by means of a pipe 100 below the cross member of the cradle.

At 109 is shown a spring-advanced plunger carried by the cradle 20, and engageable with a wall of the oil tank for holding the power assembly in an adjusted position.

The front fork 11 may be designed to replace the front fork of any of the standard makes of pedal driven bicycles, thus transforming the machine into a motorized bicycle by applying to it the front wheel, as herein shown and described.

One form of construction by which this advantage is secured is illustrated in Fig. 3, where the cross-head 110 of the front fork 11 within which the motor equipped wheel is mounted, is provided with a rigidly attached upwardly projecting short nipple 111, which is externally threaded. A tubular post 112, internally threaded at its lower end, is fitted upon the nipple 111, and secured thereto against rotation by means of a pin 113. The post 112 will take the place of the steering post of the ordinary bicycle, and to it the stem of the handle bar 13 will be secured in the usual manner. The head 114 of the bicycle frame fits over the post 112, and ball bearings, as 115, are introduced between these two elements.

The post element 112 will be made of such length as may be necessary to replace the steering post of the bicycle to which the motorized wheel is to be applied, and in marketing the improved wheel for transforming existing bicycles it will be quite practicable to supply such post elements in various lengths, corresponding with the length of the steering posts of the various generally used bicycles.

As the rotating elements of the road wheel within planes parallel with that of the road wheel in which they are enclosed, and about axes approximately coincident with its axis, a gyroscopic action is secured which steadies the wheel, renders the control of the vehicle less difficult, and increases the safety of its use. This highly desirable advantage, as well as others, are enhanced by the use of a high speed engine.

I claim as my invention—

1. In a vehicle having a chambered road wheel, a motor shiftably mounted within the wheel and having a drive wheel and a brake shoe, and manually operable means for shifting the motor to alternatively engage the drive wheel and brake shoe with the road wheel.

2. In combination with a bicycle having a chambered wheel, a friction sheave fixed to the wheel, a motor oscillatably mounted within the chamber of the named wheel and having a drive wheel, a brake shoe carried by the motor, the drive wheel and shoe being so positioned as to engage the sheave when the motor is swung in opposite directions on its support, and manual means for oscillating the motor.

3. In a bicycle having a forked frame, a cradle having trunnions fixed in the arms of the fork, a motor assembly pivotally supported in the cradle, a chambered road wheel inclosing the cradle and assembly, and journaled on the trunnions, a drive wheel actuated by the motor, a sheave attached to the road wheel and cooperating with the drive wheel, a brake shoe carried by the assembly and located diametrically opposite from the drive wheel, and manually actuated means for rocking the assembly on its pivot to alternatively engage the drive wheel or brake shoe with the sheave.

4. In a bicycle having a forked frame, a cradle having trunnions fixed in the arms of the fork, a motor assembly pivotally supported in the cradle, a chambered road wheel inclosing the cradle and assembly and journaled on the trunnions, a drive wheel actuated by the motor, a sheave attached to the road wheel and cooperating with the drive wheel, a brake shoe carried by the assembly and located diametrically opposite from the drive wheel, manually actuated means for rocking the assembly on its pivot to alternatively engage the drive wheel or brake shoe with the sheave comprising a rock shaft journaled axially through one of the trunnions, and a crank arm carried by the inner end of the rock shaft and engaging the assembly.

5. In a bicycle having a forked frame, a cradle having trunnions fixed in the arms of the fork, a motor assembly pivotally supported in the cradle, a chambered road wheel inclosing the cradle and assembly and journaled on the trunnions, a drive wheel actuated by the motor, a sheave attached to the road wheel and cooperating with the drive wheel, a brake shoe carried by the assembly and located diametrically opposite from the drive wheel, and manually actuated means for rocking the assembly on its pivot to alternatively engage the drive wheel or brake shoe with the sheave, comprising a rock shaft journaled axially through one of the trunnions, and a crank arm carried by the inner end of the rock shaft and yieldingly engaging the assembly.

6. A bicycle wheel having a rim and spaced apart sides for inclosing a motor, one of such sides comprising an annulus spaced from the center of the wheel and connected with the rim thereof and having radially inward projecting lugs, and an annular power transmitting sheave having a channel in its inner face receiving a friction wheel, such sheave having outstanding radial lugs attached to the lugs of the annulus.

7. A bicycle wheel having a rim and spaced apart sides for inclosing a motor, one of such sides comprising an annulus spaced from the center of the wheel and connected with the rim thereof and having radially inward projecting lugs having lateral instanding lips at their forward margins, and an annular power transmitting sheave having a channel in its inner face receiving a friction wheel, such sheave having outstanding radial lugs attached to the lugs of the annulus and bearing against the lips.

8. A bicycle wheel having a rim and spaced apart sides for inclosing a motor, one of such sides comprising an annulus spaced from the center of the wheel and connected with the rim thereof and having radially inward projecting lugs, and an annular power transmitting sheave, such sheave having outstanding radial lugs attached to the lugs of the annulus.

9. A bicycle wheel having a rim and spaced apart sides for inclosing a motor, one of such sides comprising an annulus spaced from the center of the wheel and connected with the rim thereof and having radially inward projecting lugs having lateral instanding lips at their forward margins, and an annular power transmitting sheave, such sheave having outstanding radial lugs attached to the lugs of the annulus and bearing against the lips.

10. A bicycle wheel having a rim and spaced apart sides for a motor, one of its sides comprising an inner sheet metal annulus carrying a hub at its inner margin, and an outer sheet metal annulus, wire spokes connecting the outer annulus with the rim, the annuli having radial lugs projecting from their contiguous margins, the lugs of the inner annulus having instanding lips at their ends overlapping the ends of the lugs of the outer annulus, and means for securing the two sets of lugs together.

11. A bicycle having a forked frame, a chambered road wheel mounted between the arms of the fork, and rotatively attached thereto at its axis, a cradle enclosed within the wheel and having trunnions attached to the fork arms at the wheel axis, a motor assembly pivotally supported by the cradle off center relatively to the wheel axis, a sheave attached to the road wheel and being coaxial therewith, a drive wheel and a brake shoe carried by the motor assembly and positioned on opposite sides of the pivot thereof to alternatively engage the sheave by the oscillation of the motor assembly.

12. A bicycle comprising, in combination, a forked frame, a chambered road wheel mounted between the arms of the fork, a cradle enclosed within the wheel and having trunnions attached to the fork arms at the wheel axis, a motor assembly oscillatably supported by the cradle off center relatively to the wheel axis, a wheel attached to the road wheel and being coaxial therewith, a drive wheel carried by the motor assembly and positioned to make and break driving connection with the second-named wheel as the motor is oscillated, and means controllable through the frame for oscillating the motor.

13. In a road vehicle, a suitable frame, a chambered drive wheel journaled on the frame, a driven member concentric with and secured to the wheel, a motor within the chamber and oscillatably mounted on an axis eccentric of the wheel, a driving member connected to the motor and projecting radially beyond the lateral wall of the motor so as to be engageable with the driven member when the motor is oscillated, and means entering the chamber at the axis of the wheel for controlling the oscillation of the motor.

14. In a road vehicle, a suitable frame, a chambered drive wheel journaled on the frame, a driven annulus concentric with and fixed to the wheel, a motor within the chamber and oscillatably mounted on an axis eccentric to the wheel, a driving member carried and actuated by the motor and located in the radial plane of the annulus and engageable therewith upon such oscillatory movement of the motor in one direction, and means entering the chamber at the axis of the wheel for controlling the oscillation of the motor.

ROGER B. McMULLEN, Jr.